March 4, 1941.                  B. ESSICK                  2,233,976
                        AIR TREATING APPARATUS
                          Filed April 15, 1940
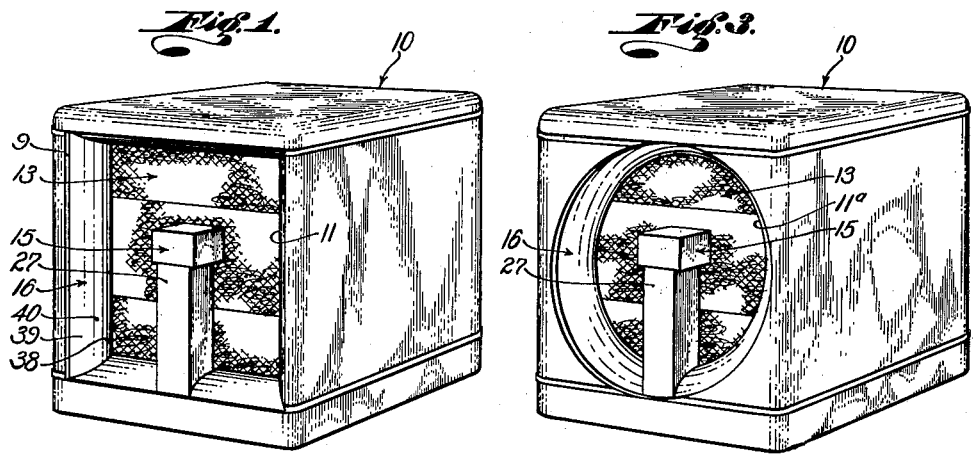
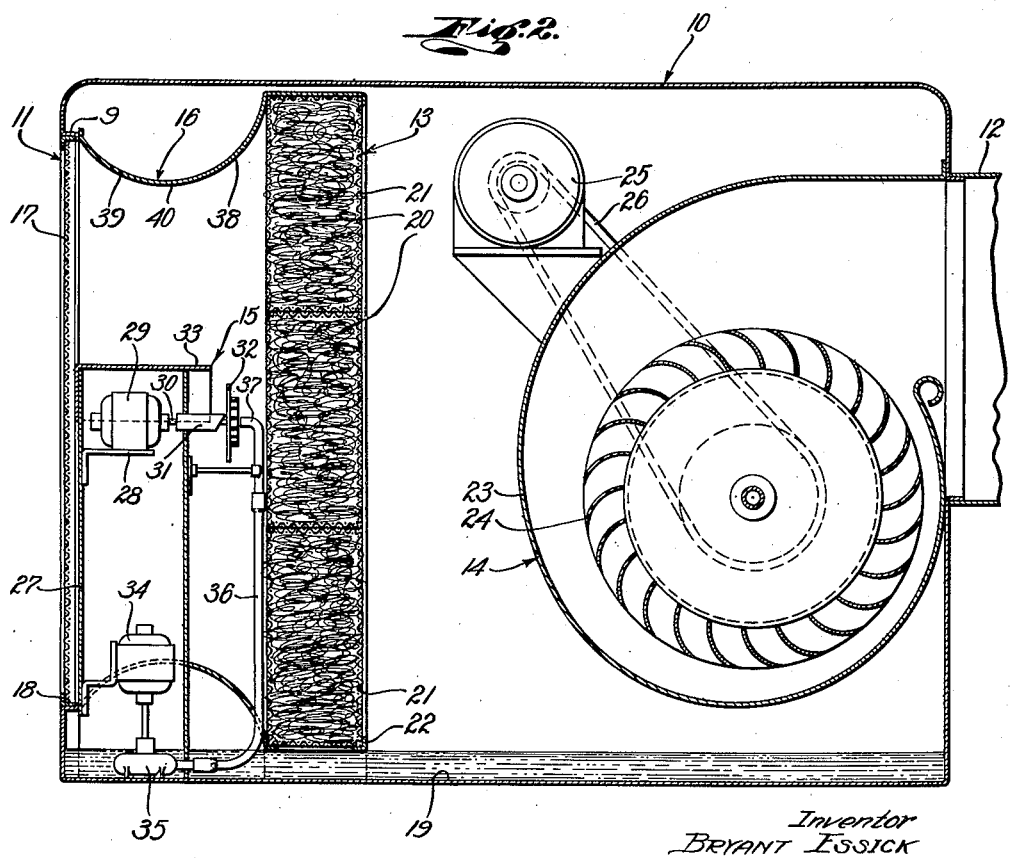
Inventor
BRYANT ESSICK
His Attorney Patented Mar. 4, 1941

2,233,976

UNITED STATES PATENT OFFICE 2,233,976

AIR TREATING APPARATUS

Bryant Essick, Los Angeles, Calif.

Application April 15, 1940, Serial No. 329,667

8 Claims. (Cl. 261—90)

This invention relates to air treating or air conditioning apparatus and relates more particularly to air filtering, cooling, and/or humidifying devices. A general object of this invention is to provide a compact, inexpensive and particularly effective device for cooling, filtering and/or humidifying air.

Another object of this invention is to provide a device of the character referred to having a filter pack, means for spraying liquid such as water on the pack to provide the cooling, filtering, or humidifying action, and novel means for supplying or passing air to the pack that prevents the sprayed liquid from splashing or passing through the air inlet whereby the inlet may be greatly reduced in length and whereby the inlet screen may be placed near the filter pack materially reducing the size and cost of the device.

Another object of this invention is to provide a device of the character referred to in which the air inlet means or air admitting means assures a better distribution of the air for passage through the filter pack, greatly increasing the efficiency of operation.

Another object of this invention is to provide a device of the character referred to in which the novel air directing or air admitting means is inexpensive and readily embodied in the device.

Another object of this invention is to provide an air treating device of the character referred to embodying a filter pack of metal, fiber, glass, wood or the like in wool form, shreds, ribbons, excelsior, etc. that is arranged or supported in such a manner that it does not pack, compress or sag.

A further object of this invention is to provide an air filter pack of the character above referred to that is inexpensive and highly effective.

The various objects and features of my invention will be fully understood from the following detailed description of typical preferred forms and applications of my invention, throughout which description reference is made to the accompanying drawing, in which:

Fig. 1 is a perspective view of one form of the invention with the inlet screen removed. Fig. 2 is an enlarged vertical detailed sectional view of the device shown in Fig. 1 and Fig. 3 is a view similar to Fig. 1 showing another form of the invention.

The improved air treating apparatus of the invention may be said to comprise, generally, a housing or body 10 having an inlet 11 and an outlet 12, a filtering, cooling and humidifying pack 13 in the body 10, means 14 for producing a movement of air through the body 10 and the pack 13, sprayer means 15 for spraying liquid on the pack 13, and means 16 for directing or conducting the air from the inlet 11 to the pack 13 to prevent the liquid from splashing through the inlet and for distributing the air across the pack 13.

Insofar as the present invention is concerned the body 10 may be of any selected or required shape and construction. In the particular case illustrated the body 10 is a rectangular hollow structure of sheet metal, or the like. The air inlet 11 is formed at one end of the body 10 and the outlet 12 may be provided in the opposite ends of the body. In Figs. 1 and 2 of the drawing the inlet 11 is square or rectangular while in Fig. 3 the inlet 11$^a$ is round or substantially cylindrical. There may be an inturned lip or flange 9 provided on the body wall of the inlet 11. A screen 17 is arranged across the inlet 11 to prevent the passage of insects, foreign particles, etc. into the body 10. The screen 17 has a suitable frame 18 seated or secured in the flange 9. The air outlet 12 may be in the form of a pipe or duct leading from the body 10. The bottom portion of the body 10 is, in whole or in part, a pan or reservoir 19 for containing a supply of the liquid or water which is to be supplied to the pack 13.

The pack 13 is arranged in the path of the air flowing through the body 10 and in the construction illustrated is arranged transversely across the interior of the body to occupy a vertical plane. In accordance with the invention the pack 13 may be positioned in spaced adjacent relation to the air inlet 11. The pack 13 is a pervious element presenting a multitude of small surfaces for carrying films of water for the required cooling effect through the evaporative action of the water and to operate as an effective cleaner or filter for the air. In accordance with the invention the pack 13 includes filtering material 20 in the form of metal such as bronze or the like, shredded or otherwise acted upon to be in wool form. It is to be understood, of course, that the material 20 may be wood, excelsior, fibrous material, glass fibers, or the like, if desired.

The invention provides novel means for containing and supporting the material 20. The pack 13 comprises two or more cells 21 each carrying or containing a body of the filtering material 20. The cells 21 are constructed of coarse mesh, metal screen, or the like of sufficient strength to adequately support and contain the material 20 and yet sufficiently open or foraminous to allow the free passage of air. The cells 21 may be rectangular and horizontally elongated. The pack cells 21 are stacked one upon the other with their broad sides vertically disposed as illustrated. A suitable frame or carrier 22 may removably support the pack cells 21 and in the case illustrated the carrier 22 supports the cells so that the lower cell 21 is spaced above the bottom of the body 10, although this is not essential. The engaging upper and lower walls of the stacked cells 21 dependably support the bodies of filtering material 20 so that the material weighted with the water or moisture cannot sag, compress, or excessively pack. It will be observed that the cooperating upper and lower walls of the cells 21 operate as horizontal rigid or substantially rigid partitions in the filter pack 13, adequately supporting the bodies of filtering material 20 against sagging and packing.

The means for causing or providing a movement of air through the body 10 and the pack 13 may be of any selected or required type. In the particular form of the invention illustrated the means 14 is in the nature of a blower having a volute case 23 and a centrifugal rotor 24 in the case. An end or side of the case 23 is open to admit air to the rotor 24 and the case 13 may discharge directly into the outlet 12. An electric motor 25 is suitably supported in the body 10 and a belt and pulley drive 26 is provided between the motor 25 and the rotor 24. The case 23 may be supported in the body 10 in the most advantageous manner. It will be readily apparent how the means 14 produces a movement of air causing the air to enter through the inlet 11 and discharge through the outlet 12.

The means 15 is provided to maintain the pack 13 in a damp or wet condition so that the air passing through the pack is cooled and humidified by the evaporative action of the liquid and is filtered. The means 15 is preferably a sprayer means so that the water has a direct cooling action upon the air passing through the device. In the preferred arrangement the sprayer means 15 is positioned in the body 10 between the inlet 11 and the filter pack 13 and, as illustrated, may include a housing 27. The housing 27 may rise vertically from the lower portion of the body 10 immediately behind the air inlet 11. A bracket 28 in the housing 27 supports an electric motor 29. The shaft 30 of the motor 29 passes rearwardly through a tube 31 set in the rear wall of the housing 27. A vaned or ribbed sprayer wheel 32 is fixed to the projecting rear portion of the shaft 30. A hood 33 may be provided on the housing 27 above the shaft 30 and the tube 31. The tube 31 and the hood 33 operate to prevent the spray or water particles from entering the housing 27 around the shaft 30.

Pump means is provided for delivering water to the sprayer wheel 32. An electric motor 34 is suitably supported in the lower portion of the housing 27 and drives a pump 35. The pump 35 is in receiving relation to the reservoir 19 and a tube or pipe 36 conducts the pumped water from the pump 35 to the wheel 32. The upper end of the pipe 36 has a nozzle or discharge 37 facing the wheel 32. The liquid or water passes from the discharge 37 in a stream to impinge against the rotating wheel 32 and the wheel breaks the water up into a spray and distributes the spray against the forward face of the filter pack 13. The unevaporated water drips or runs from the pack 13 to return to the reservoir 19 for recycling.

The means 16 is an important feature of the invention and serves to prevent the spray or water particles, flung outwardly by the means 15, from passing or splashing to or through the inlet screen 17. The means 16 is a tubular part or structure defining an air passage which leads from the inlet 11 to the filter pack 13. In the case where the inlet 11 is rectangular the means 16 provides or defines a rectangular passage and where the inlet 11a is round, as in Fig. 3, the means 16 defines a round passage. The air passage defined by the means 16 is of peculiar or special configuration. The inner or rear portion of the means 16 presents a forwardly and radially inward sloping, pitched or curved surface 38 and the forward or outer portion of the means 16 presents a forwardly and outwardly sloping, pitched or curved surface 39. The surface 38 preferably extends forwardly from or immediately adjacent the face of the pack 13 while the surface 39 may extend rearwardly from the screen 17 or the flange 16. The converging surfaces 38 and 39 form or join at or may be considered a restriction 40. It will be seen that the walls 38 and 39 provide a Venturi tube passage immediately in front of the filter pack 13. In the preferred construction illustrated the surfaces 38 and 39 are curved or convex, it being understood that the surfaces 38 and 39 may be flat or angular, if desired.

The parts are related so that the sprayer wheel 32 lies in the inner portion of the means 16, that is, in a vertical or transverse plane that passes through the wall 38. Where the means 16 is annular or round, as in Fig. 3, the walls 38 and 39, are regular and continuous and where the means 16 is rectangular, as in Figs. 1 and 2, the walls 38 and 39 have angularly related parts defining a rectangular passage. The drops or water particles flung radially from the wheel 32 strike the inwardly or rearwardly flaring wall 38 and are deflected rearwardly thereby to the filter pack 13 and cannot reach the screen 17 or the inlet 11. The velocity of the entering air is increased as the air passes through the Venturi-like passage defined by the walls 38 and 39 and this increase in the velocity of the air further assists in directing the spray inwardly against the pack 13. The air in its passage through the means 16 tends to follow the rearwardly flaring wall 38 and a substantial portion of the air is thus delivered to the marginal parts of the pack 13 which otherwise would receive but little air.

It is believed that the operation of the device of the present invention will be understood from the foregoing detailed description. Assuming that the motors 25, 29 and 34 are in operation, air is drawn or moved through the body 10 and the filter pack 13 and the cooling medium or water is discharged from the wheel 32 in the form of a spray. The major portion of this spray is carried rearwardly into the pack 13 by the rearwardly moving air and the velocity of the air is increased to some extent by the Venturi effect of the means 16 so that the air better directs and distributes the water spray against the pack 13. The water particles or drops that reach the means 16 are directed rearwardly and to some extent laterally by the rearwardly flaring wall 38. The water particles or drops striking the wall 38 cannot bounce or glance forwardly and, therefore, cannot reach the screen 17 or the inlet 11. The screen 17 accordingly remains dry at all times and does not accumulate dust particles. The wall 38 of the means 16 operating to prevent the forward splashing of the spray allows the device to be considerably shortened and permits the placement of the inlet 11 and the screen 17 adjacent the pack 13.

The means 16 in addition to preventing an undesirable splashing of the spray through the inlet provides for a better distribution of the incoming air across the face of the filter 13. The air flowing through the Venturi passage defined by the means 16 follows the rearwardly and outwardly curving or flaring wall 38 and thus reaches the marginal portions of the filter 13. The air thus flowing along the wall 38 assists in carrying the spray to the marginal parts of the pack 13. The material 20 of the filter pack 13 is dependably supported by the upper and lower walls of the cells 21 so that it cannot sag, pack or excessively compress, even though weighted with a substantial quantity of water. Accordingly, the pack 13 remains efficient and fully effective for an indefinite period.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In a device of the character described, a body having an air inlet, an air pervious pack in the body spaced inwardly from the inlet, a liquid sprayer at the face of the pack, and means defining a Venturi passage between the inlet and pack with the transverse plane of greatest passage restriction spaced between the sprayer and the inlet.

2. A device of the character described comprising a body having an air inlet opening and an air outlet opening, means for producing air movement through the body, an air pervious pack in the body between the openings, means spaced in front of the pack for spraying water to wet the pack, and a wall in the body around the means for spraying water forming an air duct and pitched toward the pack so water striking it from the spraying means is deflected toward the pack.

3. In a device of the character described, a body having an air inlet, an air pervious pack in the body spaced inwardly from the inlet, a water spraying means located in front of the pack between the pack and inlet for wetting the pack, and a wall in the body around the spraying means and pitched toward the pack so water striking it from the spray means is deflected toward the pack, there being a sump in the body below said wall for holding water.

4. In a device of the character described, a body having an air inlet, an air pervious pack in the body spaced inwardly from the inlet, a wall in the body defining an air passage which has an outer part receiving air from the inlet and gradually decreasing in cross-section as it advances in the body and an inner part which is continuous with the outer part and directs air onto the pack and gradually increases in cross section as it approaches the pack, and a water spraying means spaced forward of the pack and within the inner part of the air passage.

5. In a structure of the character described, a casing having an air inlet opening and an air outlet opening, an air pervious pack in the body between the openings, means for producing air movement through the body, and means in the casing for spraying water to wet the pack including a revolving plate between the pack and air inlet facing the pack, a water circulating system in the casing including a water delivery outlet between the pack and plate directing water toward the plate, and an element rotatable with the plate and at the face of the plate facing the pack for dispersing the water.

6. In a structure of the character described, a casing having an air inlet opening and an air outlet opening, a vertically disposed air pervious pack in the body between the openings, means for producing air movement through the body, and means in the casing between the pack and air inlet for spraying water to wet the pack including a revolving plate facing and substantially parallel with the pack, a plurality of projections on the plate projecting therefrom toward the pack, and a water supply delivering water toward the face of the plate to be broken up and thrown by the combined action of the plate and projections.

7. In a structure of the character described, a casing having an air inlet opening and an air outlet opening, an air pervious pack in the body between the openings, there being a sump in the casing below the pack, means for producing air movement through the body, and means in the casing for spraying water to wet the pack including a ribbed sprayer wheel between the pack and air inlet and a pump receiving water from the sump and delivering it onto the wheel to be sprayed and distributed thereby onto the pack.

8. In a structure of the character described, a casing having an air inlet opening and an air outlet opening, a vertically disposed air pervious pack in the body between the openings, means for producing air movement through the body, and means in the casing between the pack and air inlet for spraying water to wet the pack including a flat motor driven plate facing the pack, a plurality of water dispersing projections on the face of the plate, and means between the plate and pack directing water toward the plate to be broken up and thrown by the combined action of the plate and projections.

BRYANT ESSICK.